(12) United States Patent
Bednar

(10) Patent No.: US 10,980,227 B1
(45) Date of Patent: Apr. 20, 2021

(54) HUNTING DECOY

(71) Applicant: James R. Bednar, Mayville, WI (US)

(72) Inventor: James R. Bednar, Mayville, WI (US)

( * ) Notice: Subject to any disclaimer, the term of this patent is extended or adjusted under 35 U.S.C. 154(b) by 0 days.

(21) Appl. No.: 16/653,336

(22) Filed: Oct. 15, 2019

(51) Int. Cl.
*A01M 31/06* (2006.01)

(52) U.S. Cl.
CPC .................. *A01M 31/06* (2013.01)

(58) Field of Classification Search
CPC ...................................... A01M 31/06
USPC .......................................... 43/2, 3
See application file for complete search history.

(56) References Cited

U.S. PATENT DOCUMENTS

| | | | | |
|---|---|---|---|---|
| 295,013 | A * | 3/1884 | Hunter | F41H 5/12 89/36.06 |
| 1,430,661 | A * | 10/1922 | Lewis | F41A 13/02 89/193 |
| 4,733,490 | A * | 3/1988 | Mulawski | F41G 1/545 42/134 |
| 4,817,579 | A * | 4/1989 | Mathias | F41B 5/1496 124/23.1 |
| 5,127,180 | A * | 7/1992 | Norton | A01M 31/00 135/901 |
| 5,235,772 | A * | 8/1993 | Mendick, Jr. | A01M 31/00 124/23.1 |
| 5,522,168 | A * | 6/1996 | Friddle | A01M 31/06 43/1 |
| 5,944,041 | A | 8/1999 | Kitchens | |
| 6,543,175 | B1 | 4/2003 | Tucker | |
| 7,216,644 | B2 | 5/2007 | Haugen | |
| 7,275,532 | B2 * | 10/2007 | Niemackl | F41B 5/14 124/23.1 |
| 7,828,003 | B2 | 11/2010 | Montecucco | |
| 7,958,878 | B2 * | 6/2011 | Hoffmann | F41H 3/02 124/25 |
| 8,104,395 | B2 * | 1/2012 | Ran | F41C 27/04 89/36.06 |
| 8,701,332 | B1 * | 4/2014 | Chavez | A01M 31/06 43/2 |
| 8,720,428 | B2 * | 5/2014 | Jantzen | F41H 3/02 124/86 |
| 8,793,922 | B2 | 8/2014 | Roe | |
| 8,869,783 | B2 | 10/2014 | Faherty | |
| 9,345,240 | B1 | 5/2016 | Cain, Jr. | |
| 9,622,468 | B2 | 4/2017 | Downard | |
| 9,661,842 | B2 | 5/2017 | Cain, Jr. | |

(Continued)

*Primary Examiner* — David J Parsley
(74) *Attorney, Agent, or Firm* — Wozny Law, LLC; Thomas M. Wozny

(57) ABSTRACT

A hunting decoy designed to conceal a sportsman hunting wild game animals, especially wild turkeys. The hunting decoy includes a flat panel frame having a forward-facing surface for supporting a decoy image of an animal thereon. The frame has a sight window formed therein and a mounting aperture formed therein disposed beneath the sight window. The sight window defines a hunter's line-of-sight substantially perpendicular to the forward-facing surface of the frame. The mounting aperture is dimensioned to slidably receive therethrough a support member of a hunting weapon, such as the barrel of a hunting gun, so that a compressible mounting member, such as a rubber grommet, in the mounting aperture fixedly mounts the frame on the support member substantially perpendicular to the hunter's line-of-sight.

20 Claims, 3 Drawing Sheets

(56) References Cited

U.S. PATENT DOCUMENTS 10,477,858 B2 * 11/2019 Pauley ................. A01M 31/06
2014/0130396 A1 5/2014 Yaron

* cited by examiner

HUNTING DECOY

BACKGROUND OF THE INVENTION

The present invention relates to hunting decoys, and more specifically to a hunting decoy slidably and removably mountable on a support member of a hunting weapon, especially the barrel of a shotgun or rifle, for hunting wild game animals, such as turkeys.

Hunting decoys are well known in the art for stalking, luring and harvesting many different species of wild game animals. However, hunting wild turkeys presents a unique challenge. During turkey mating season, male turkeys, called toms or gobblers, seek out and court female turkeys, called hens. In a courtship ritual, a tom will usually spread and raise his tail feathers, blush his head to dark blue, then stretch forward, gobble and strut. When a tom is strutting, the long, red, fleshy area that grows from his forehead over his bill, called a snood, and the fleshy growth under the tom's throat, called a wattle, engorge with blood, turn bright red, extend, and hang downwardly to attract a hen. Another distinguishing feature of wild turkeys is the black fibrous hairs that hang down from the chest away from the body plumage, called a beard.

Toms or gobblers are usually very defensive of their mating territory, and may confront or attack an intruding tom, especially when the intruding tom is strutting and gobbling in his territory or at his hens. Hunters take advantage of this aggressive behavior to lure toms into shooting range with turkey decoys.

Many different types of turkey decoys are known in the art. See, for example, the decoys illustrated and described in U.S. Pat. Nos. 9,622,468, 9,345,240 and 6,543,175 as well as in US Patent Publication No. 2014/0130396.

SUMMARY OF THE INVENTION

A hunting decoy designed to conceal a sportsman hunting wild game animals, especially wild turkeys. The hunting decoy includes a frame having a forward-facing surface for supporting a decoy image thereon. The frame has a sight window formed therein and a mounting aperture formed therein disposed beneath the sight window. The sight window defines a line-of-sight which is substantially perpendicular to the forward-facing surface of the frame, and the mounting aperture is dimensioned to slidably receive therethrough a support member on which it is mounted. The support member may be (a) a barrel of a shotgun, a rifle or a crossbow, or (b) a riser of a crossbow, a compound bow or a recurve bow, or (c) a sighting device, such as a scope, of a shotgun, a rifle, a crossbow, a compound bow or a recurve bow, or (d) a stabilizer of a compound bow or a recurve bow, or (e) a stirrup of a crossbow, or (f) a component of binoculars, such as its eyepiece, telescope or focusing frame, or (g) a component of a spotting scope, such as its eyepiece, telescope or tripod, or (h) an elongated camera lens. A compressible mounting member in the mounting aperture, preferably a rubber grommet, fixedly mounts the frame on the support member in a substantially perpendicular orientation to the line-of-sight.

The frame is preferably a substantially flat panel member which is black or dark in color, and the decoy image on its forward-facing surface may be either two dimensional or three dimensional. In two dimensions, the decoy image may simply be a silhouette or frontal likeness of an animal, for example the head, neck, chest and shoulders of the animal, printed on paper or fabric. In three dimensions, the decoy image might be comprised of an imitation head of the animal mounted on and projecting from the frame or certain distinguishing features of an animal such as a turkey beard hanging down from the frame and turkey feathers arranged in a fan-like manner on the frame. The decoy image may be that of any of numerous wild game animals such as a turkey, a deer, an antelope, an elk, a coyote, a bobcat, a boar, a moose, a caribou, a bison, a bear, a cougar, a sheep, a mountain goat, a cow, a crane, a goose, or a swan. The cow image referred to is typically merely a decoy and not a hunted game animal. However, cows are often common to the western range landscape, and a cow decoy image is thus useful to conceal a sportsman hunting other game on the western range.

In an embodiment where the hunting decoy is utilized with a gun such as a shotgun or rifle, the mounting aperture preferably is a round or circular opening having a diameter substantially equal to the outer diameter of the barrel of the hunting gun which defines an outer circumferential surface for the mounting aperture on the frame. The mounting member preferably is a substantially U-shaped radially compressible element lining the outer circumferential surface of the mounting aperture, such as a rubber grommet, to provide an interference fit between the outer surface of the gun barrel and the inner surface of the mounting member. The frictional force developed by the interference fit between the mounting member or rubber grommet and the gun barrel provides not only sufficient frictional force to fixedly mount the decoy on the gun barrel, but also permits the decoy to be slid along the gun barrel to any comfortable position desired by a hunter. In other embodiments, the mounting aperture has an outer circumferential surface that conforms to the shape of the particular support member on which the decoy is to be mounted, and thus may have a shape other than round or circular. In such embodiments, the mounting member comprises a compressible element of a shape corresponding to that of the mounting aperture that lines the outer circumferential or peripheral surface of the mounting aperture to provide the interference fit. For example, the mounting aperture and compressible mounting member may take the shape of a figure eight in order to accommodate an "over-under" or "side-by-side" double barrel shotgun.

A channel connecting the sight window and mounting aperture enables the decoy to be used with hunting guns having vent ribs on its barrel as well as non-vented hunting guns. The compressible mounting member enables the decoy to be used with a .410 bore shotgun (sometimes referred to as a .410 gauge or 68 gauge shotgun), a 28 gauge shotgun, a 20 gauge shotgun, a 16 gauge shotgun, a 12 gauge shotgun, or a 10 gauge shotgun, or even rifles such as a 22 caliber rifle or a 30-06 rifle. In other embodiments, the decoy can be mounted to a support member of a compound bow, recurve bow or a crossbow such as the barrel of a crossbow, or the riser of a crossbow, a compound bow or a recurve bow, or the sighting device of a crossbow, a compound bow or a recurve bow, or the stabilizer of a compound bow or a recurve bow, or the stirrup of a crossbow, or a component of binoculars, such as its eyepiece, telescope or focusing frame, or a component of a spotting scope, such as its eyepiece, telescope or tripod, or an elongated camera lens. In still other embodiments, a scope mounted on a hunting weapon such as a gun or bow can be used simultaneously in combination with the sight window where a user can first view through the scope which can then in-turn view through the sight window of the decoy mounted, for example on the barrel of a gun, in front of the scope.

DETAILED DESCRIPTION OF THE INVENTION

Figure 1:
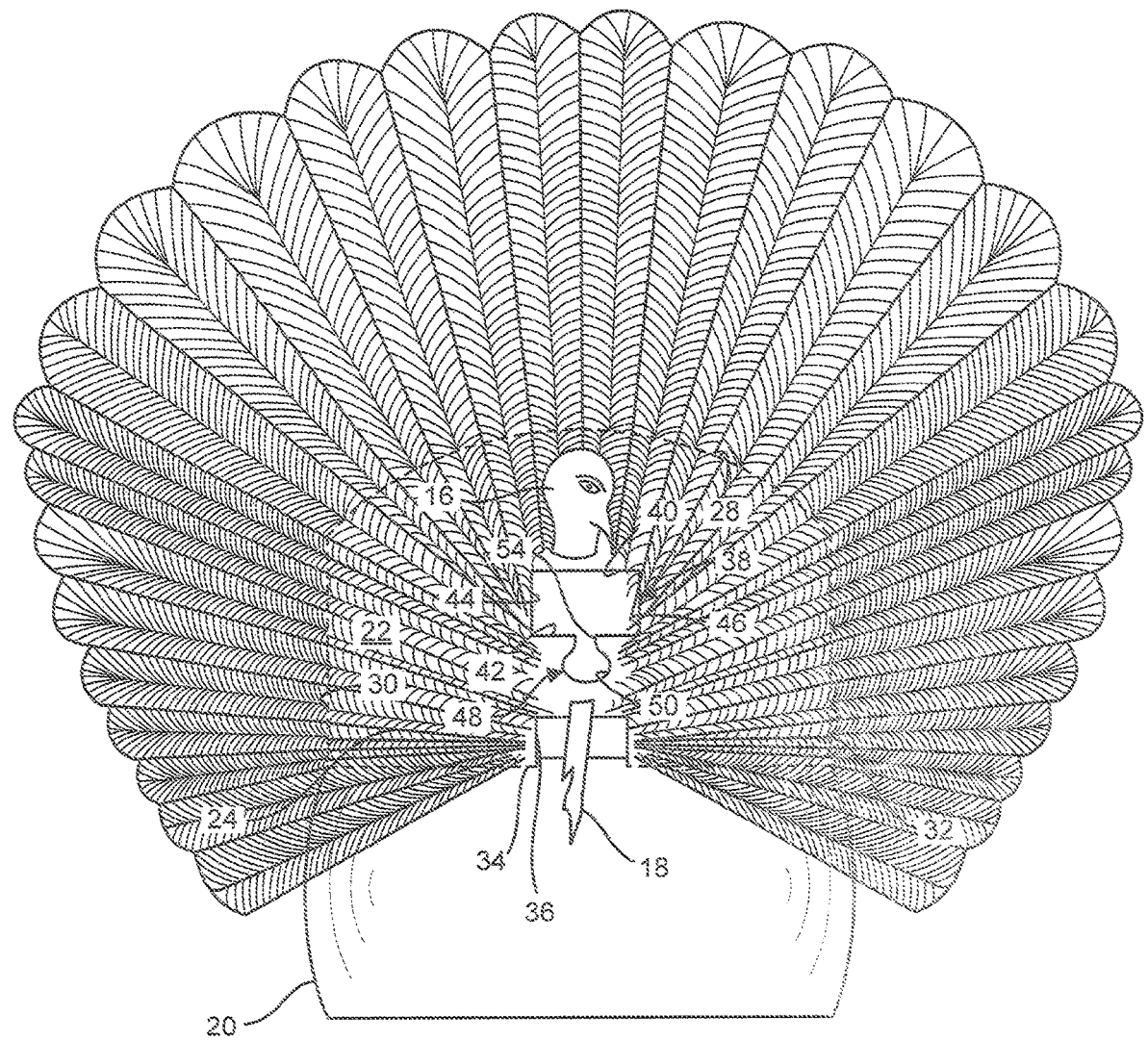
FIG. 1 is a front perspective view of a hunting decoy in accordance with the present invention illustrating the decoy with the image of a turkey thereon.
Figure 2:
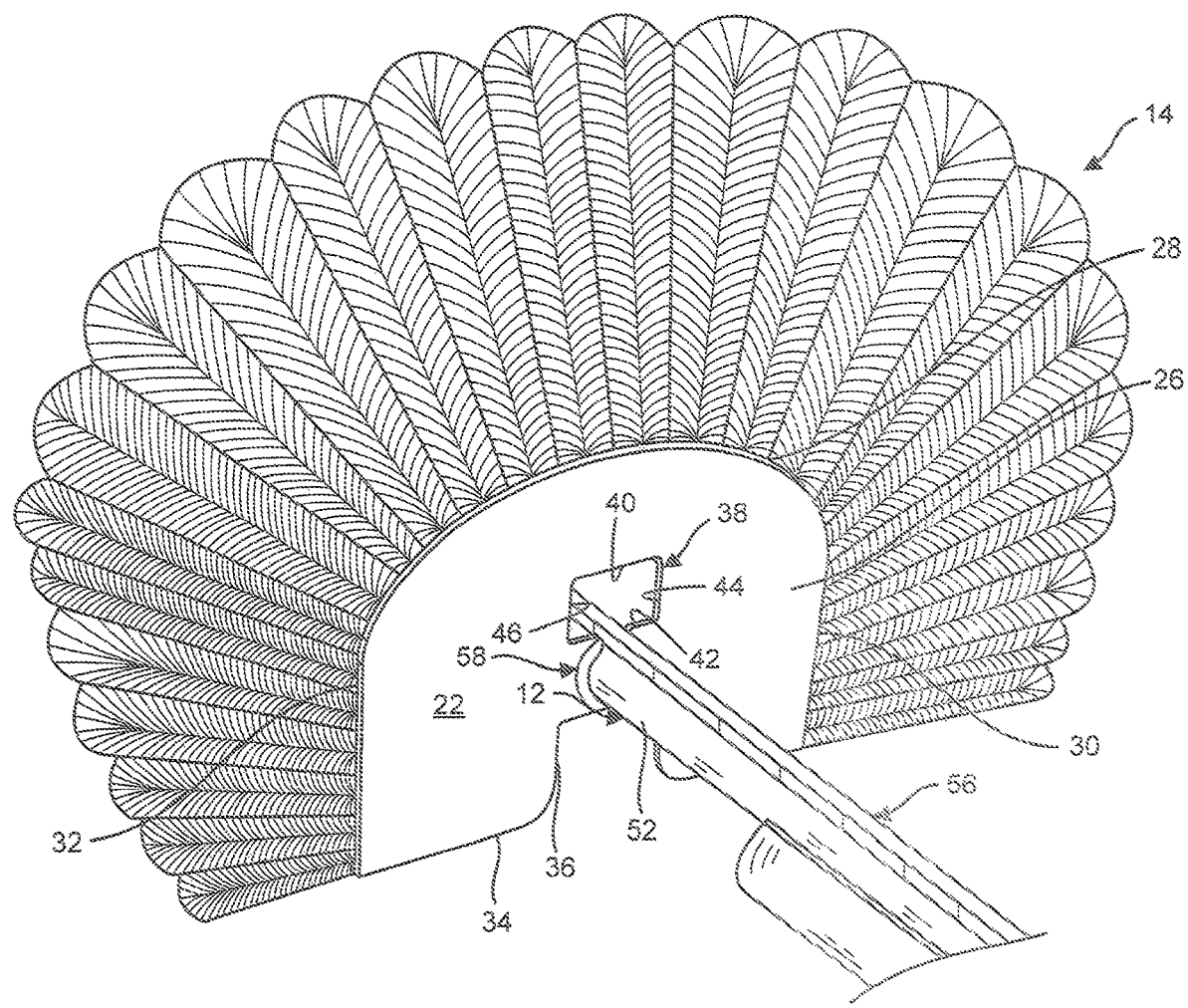
FIG. 2 is an enlarged detailed rear perspective view of the hunting decoy illustrated in FIG. 1.

FIG. 1 provides an example of an embodiment of a hunting decoy, generally designated by the number 10, mountable on a support member of a hunting weapon 12. The hunting weapon 12 may be a shotgun, a rifle, a crossbow, a compound bow, or a recurve bow. The hunting weapon 12 is illustrated in FIG. 2 as being a 12 gauge shotgun, and the support member is illustrated as being barrel 52 of shotgun 12, but in alternate embodiments, the 12 gauge shotgun illustrated may be a 10 gauge shotgun, or a 16 gauge shotgun, or a 20 gauge shotgun, or a 28 gauge shotgun, or a .410 bore shotgun (sometimes referred to as a .410 gauge or 68 gauge shotgun), as the difference between shotgun gauges is merely the bore diameter of its barrel (0.775 inches for a 10 gauge, 0.729 inches for a 12 gauge, 0.662 inches for a 16 gauge, 0.615 inches for a 20 gauge, 0.550 inches for a 28 gauge, and 0.410 inches for a .410 bore or 68 gauge) as is commonly known in this art. Thus, the illustration of a 12 gauge shotgun in FIG. 2 is a substantial illustration of the other shotgun gauges as well. In additional alternate embodiments, the hunting weapon 12 may be a rifle, such as a 22 caliber rifle or a 30-06 rifle, and may have a vent rib on top of its barrel or be a non-vented shotgun or rifle. In still other embodiments, the decoy 10 may be used in non-weapon applications, such as being mounted on a support member of binoculars, a spotting scope, or an elongated camera lens. In use, the support member on which decoy 10 is mounted may be (a) a barrel of a shotgun, a rifle or a crossbow, or (b) a riser of a crossbow, a compound bow or a recurve bow, or (c) a sighting device, such as a scope, of a shotgun, a rifle, a crossbow, a compound bow or a recurve bow, or (d) a stabilizer of a compound bow or a recurve bow, or (e) a stirrup of a crossbow, or (f) a component of binoculars, such as its eyepiece, telescope or focusing frame, or (g) a component of a spotting scope, such as its eyepiece, telescope or tripod, or (h) an elongated camera lens.

FIG. 1 also illustrates an example of an embodiment of the hunting decoy 10 having a decoy image used therewith for concealing a hunter. In the embodiment of FIG. 1, the decoy image is that of a wild turkey and thus is specifically designed for hunting wild turkeys. To that end, the turkey decoy image illustrated includes turkey tail feathers 14 disposed in a generally radial, fan-like pattern. The turkey decoy image further includes an imitation turkey head 16, typically blue in color, projecting forwardly from decoy 10, and a long imitation turkey beard 18 hanging downwardly from decoy 10. A dark curtain 20 hangs downwardly from decoy 10 behind beard 18 to further conceal a hunter behind decoy 10. The illustrated turkey decoy image is thus intended not only to conceal a hunter behind decoy 10, but also to provide a three dimensional structure resembling a real live wild turkey. This is because three dimensional structures create natural shadows and depth, can move with the wind, and appear more natural to a wild turkey by looking like and simulating the movement of another wild turkey. As a result, decoy 10, as illustrated in FIG. 1, provides an excellent way for a hunter to lure a wild turkey into shooting range, or for a hunter to approach quarry unidentifiable as a human threat.

Although illustrated with a turkey decoy image, decoy 10 may also be used to hunt other wild game. In such circumstances, the decoy image might be that of a deer, an antelope, an elk, a coyote, a bobcat, a boar, a moose, a caribou, a bison, a bear, a cougar, a sheep, a mountain goat, a cow, a crane, a goose, or a swan. Further, instead of the image of a wild game animal, or optionally in addition thereto, decoy 10 could use other types of camouflage such as brush, tree branches, small tree limbs, or other vegetation to blend into the local environment. The decoy image may be three dimensional or two dimensional.

As illustrated in FIGS. 1 and 2, hunting decoy 10 comprises a frame 22 for supporting the decoy image and camouflage thereon having a forward-facing surface 24 and a rearward-facing surface 26. Frame 22 is preferably a substantially flat panel member made of plastic or wood such as plywood, and is typically about 36 inches wide, 24 inches tall, and 0.5 inch thick. As shown in FIGS. 1 and 2, frame 22 has an arcuate-shaped top edge 28, vertically extending left and right opposite side edges 30 and 32, and a horizontally extending straight bottom edge 34 having a cut-out 36 therein which reduces the overall weight of decoy 10 and thus aids in the portability of decoy 10. Further, the center of gravity of frame 22 is preferably located midway between side edges 30 and 32 and closer to bottom edge 34 than to top edge 28 which aids in stabilizing decoy 10 when mounted on hunting weapon 12.

Turkey feathers 14 may be glued, stapled or otherwise attached, such as by hook and loop fasteners, to both the forward-facing surface 24 as well as the rearward-facing surface 26 of frame 22, as shown in FIGS. 1 and 2. Feathers 14 are attached to frame 22 in a generally radial, fan-like pattern projecting outwardly from side edges 30 and 32 and top edge 28 to resemble the raised and spread tail feathers of a live wild turkey. Alternately, the turkey-tail fan could be constructed of a material framed in the shape of a fanned turkey-tail with life-like and realistic turkey-tail feathers either printed or painted thereon. The imitation turkey head 16 is also attached to forward-facing surface 24 and is centrally located just beneath the apex of top edge 28. The imitation turkey head 16 may be a three dimensional member projecting from forward facing surface 24, or may be a two dimensional member by being printed or painted onto paper or fabric which in turn is attached to the forward facing surface 24 of frame 22. Curtain 20 may be made of any dark fabric and is preferably glued and stapled to frame 22 along bottom edge 34 to hang downwardly from decoy 10. Likewise, the imitation turkey beard 18 is attached to frame 22 along bottom edge 34 to hang outwardly and downwardly from decoy 10.

Figure 3:
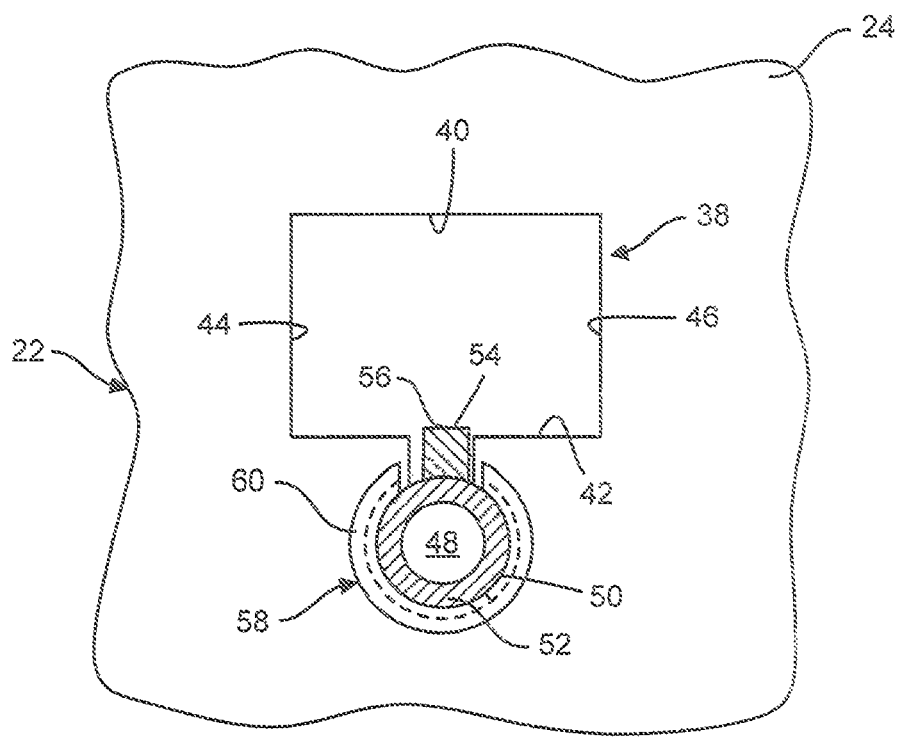
FIG. 3 is an enlarged fragmentary rear elevational view of a portion of the frame of the decoy illustrating the sight window and the mounting aperture in detail.

As shown in FIGS. 2 and 3, frame 22 has a sight window 38 formed therein which provides a line-of-sight extending perpendicular to the forward-facing surface 24 for a hunter hiding behind decoy 10. Sight window 38 is centrally located between side edges 30 and 32 as well as between top edge 28 and bottom edge 34 directly beneath the apex of top edge 28. Sight window 38 is rectangular in shape having an upper edge 40, a lower edge 42, and opposite left and right side edges 44 and 46, and is about 2 inches wide and 1.5 inches tall to enable a hunter to see through decoy 10 and take aim at a wild turkey or other quarry. Sight window 38 may also be round, oblong, oval, hexagonal or any other shape desired, and may have different dimensions than those specified herein, so long as it permits a hunter to see through decoy 10 along the hunter's intended line-of-sight, and is not too large so that it enables a wild turkey or other quarry to see the hunter behind decoy 10.

As also shown in FIGS. 2 and 3, frame 22 also has a gun-barrel-receiving mounting aperture 48 formed therein beneath sight window 38. Aperture 48 is round in shape, and comprises a circular opening having a diameter of about 1 inch which is about equal to the outer diameter of the barrel 52 of shotgun 12. Aperture 48 defines an outer peripheral or circumferential surface 50 on frame 22, and slidably receives barrel 52 of shotgun 12 so that barrel 52 projects forwardly from decoy 10, as shown best in FIG. 1.

A channel 54 cut into frame 22 interconnects the lower edge 42 of sight window 38 with the top of gun-barrel-receiving mounting aperture 48. Channel 54 slidably receives vent rib 56 of shotgun 12, and has a width of approximately 5/16 inch. The combination of channel 54 and aperture 48 permits use of shotguns having a vent rib, or shotguns without a vent rib, with decoy 10.

Figure 4:
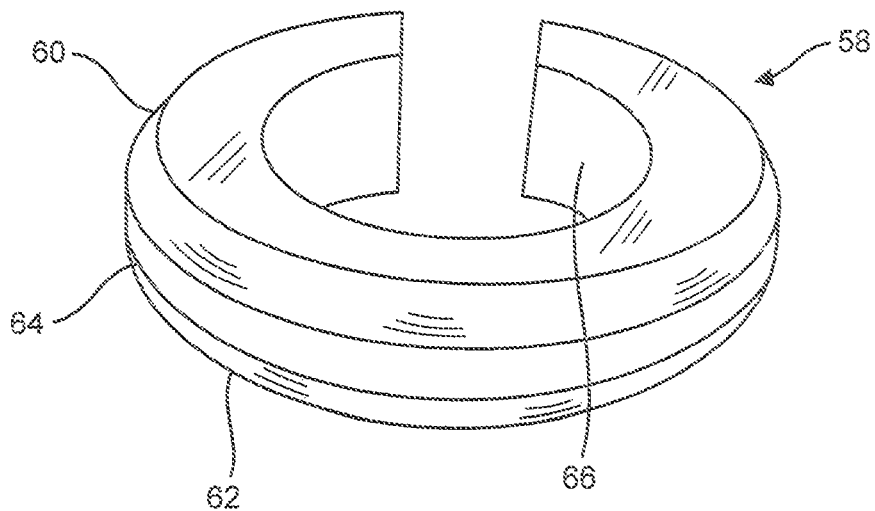
FIG. 4 is an enlarged perspective view of a mounting grommet used to line the mounting aperture and mount the decoy on the barrel of a hunting gun.

As shown in FIGS. 3 and 4, a mounting member 58 on frame 22 disposed within aperture 48 slidably and fixedly mounts frame 22, and thus decoy 10, on barrel 52 of shotgun 12 in a position substantially perpendicular to barrel 52. Mounting member 58 is made of an elastic material such as rubber, and thus comprises a substantially U-shaped, radially compressible element lining the outer circumferential or peripheral surface 50 of aperture 48. Preferably, mounting member 58 is a U-shaped rubber grommet having a front collar 60 and a rear collar 62 defining a groove 64 for receiving the outer circumferential or peripheral surface 50 of gun-barrel-receiving aperture 48. The axial width of groove 64 is substantially the same as the thickness of frame 22 which thereby provides a sufficient frictional force between member 58 and frame 22 to fixedly mount member 58 on frame 22. The radial depth of groove 64 is sufficient to enable the front collar 60 and rear collar 62 to overlap the edges of aperture 48 a sufficient distance to further ensure there is sufficient frictional force between member 58 and frame 22 to provide a snug and secure fit of member 58 in aperture 48. The radially inner end of member 58 may be squared off to match the squared off edge of aperture 48 or may be arcuate-shaped so long as it provides the compressibility or resiliency necessary to fixedly hold the barrel of shotgun 12 therein. Member 58 has a central opening defined by inner circular peripheral surface 66 that has a diameter less than the diameter of barrel 52 of shotgun 12 so that when barrel 52 is received within member 58 the barrel 52 compresses member 58 radially to create a frictional force between barrel 52 and member 58. The frictional force between member 58 and barrel 52 is sufficient to fixedly mount and attach decoy 10 on barrel 52, yet also allow decoy 10 to be slid forwardly or rearwardly along the length of barrel 52.

In use, the barrel 52 of shotgun 12 is slid into aperture 48 through mounting member 58 until decoy 10 is positioned at a hunter's desired location on barrel 52. As this action occurs, mounting member 58 is compressed due to the interference fit between the outer surface of barrel 52 and the inner surface 66 of member 58 so that the radial friction forces developed between barrel 52 and member 58 fixedly mount and hold decoy 10 in the desired perpendicular location on barrel 52. Further, due to the compressibility of member 58, decoy 10 may be used with and mounted on the barrels of different hunting guns such as 10, 12, 16, 20, 28 and 68 (.410 bore) gauge shotguns as well as double barrel shotguns and hunting rifles such as a 22 caliber rifle or a 30-06 rifle. It should be noted, however, that the specific dimensions of mounting aperture 48 and mounting member 58 will need to be adjusted in order to facilitate a wide range of exterior gun barrel dimensions because there is a substantial size difference in outside barrel diameters between a 10 gauge shotgun and a 22 caliber rifle. If desired, the decoy 10 may also be mounted to a support member at the frontal area of a compound bow, a recurve bow or a crossbow which would merely require slight modifications to the dimensions of the mounting aperture 48 and the mounting member 58 to conform to that of the particular support member on which decoy 10 is to be mounted. Similar adjustments would need to be made should the decoy 10 be mounted on binoculars, a spotting scope or a camera lens.

Decoy 10 may thus be mounted to any of various components or support members such as (a) a barrel of a shotgun, a rifle or a crossbow, or (b) a riser of a crossbow, a compound bow or a recurve bow, or (c) a sighting device of a shotgun, a rifle, a crossbow, a compound bow or a recurve bow, or (d) a stabilizer of a compound bow or a recurve bow, or (e) a stirrup of a crossbow, or (f) a component of binoculars, such as its eyepiece, telescope or focusing frame, or (g) a component of a spotting scope, such as its eyepiece, telescope or tripod, or (h) an elongated camera lens. As is apparent to one skilled in this art, the dimensions of the mounting aperture 48 and mounting member 58 would need to vary in order to conform to and accommodate the shape of the particular support member on which decoy 10 is used.

I claim:

1. A hunting decoy, comprising:
    a frame having a forward-facing surface for supporting a decoy image thereon, said frame having a sight window formed therein and a mounting aperture formed therein disposed beneath said sight window, said mounting aperture defining a rim having an inner surface, and said sight window defining a line-of-sight substantially perpendicular to the forward-facing surface of said frame; and
    a mounting member disposed in said mounting aperture and attached to said rim for fixedly mounting said frame substantially perpendicular to said line-of-sight on a support member extending through a central opening formed in said mounting member, said support member having an outer surface defining an exterior profile, and said mounting member comprises a compressible element having an outer surface engageable with the inner surface and rim of said mounting aperture in said frame to hold said mounting member in said mounting aperture and said mounting member having an inner surface defining an interior profile substantially conforming to the exterior profile of said support member so as to provide an interference fit between the outer surface of the support member and the inner surface of the mounting member, said interference fit providing sufficient frictional force to fixedly mount the frame on the outer surface of the support member.

2. The hunting decoy of claim 1, wherein said mounting member is made of an elastic material.

3. The hunting decoy of claim 2, wherein said mounting member comprises a U-shaped compressible element lining the surface of said mounting aperture.

4. The hunting decoy of claim 3, wherein said mounting member comprises a rubber grommet.

5. The hunting decoy of claim 4, wherein said rubber grommet has a collar on each side thereof defining a groove therebetween, said groove receiving the rim and inner surface of said mounting aperture.

6. The hunting decoy of claim 1, wherein the decoy image comprises camouflage or a likeness of an animal.

7. The hunting decoy of claim 6, wherein the likeness of an animal is selected from the group consisting of a turkey, a deer, an antelope, an elk, a coyote, a bobcat, a boar, a moose, a caribou, a bison, a bear, a cougar, a sheep, a mountain goat, a cow, a crane, a goose, and a swan.

8. The hunting decoy of claim 1, wherein said support member comprises a component of a hunting weapon selected from the group consisting of a 10 gauge shotgun, a 12 gauge shotgun, a 16 gauge shotgun, a 20 gauge shotgun, a 28 gauge shotgun, and a .410 bore shotgun, a rifle, a crossbow, a compound bow, and a recurve bow.

9. The hunting decoy of claim 1, wherein said support member comprises a component of a device selected from the group consisting of binoculars, a spotting scope, and an elongated camera lens.

10. The hunting decoy of claim 1, wherein said support member comprises a barrel of a gun, a barrel of a crossbow, a riser of a crossbow, a riser of a compound bow, a riser of a recurve bow, a sighting scope of a shotgun, a sighting scope of a rifle, a sighting scope of a crossbow, a sighting scope of a compound bow, a sighting scope of a recurve bow, a stabilizer of a compound bow, a stabilizer of a recurve bow, or a stirrup of a crossbow.

11. The hunting decoy of claim 1, wherein said frame is a substantially flat panel member, and said decoy image is either two dimensional or three dimensional.

12. A hunting decoy in combination with a hunting gun, comprising:
 a frame having a forward-facing surface for supporting a decoy image thereon, said frame having a sight window formed therein and a mounting aperture formed therein disposed beneath said sight window, said mounting aperture defining a rim having an inner surface, and said sight window defining a hunter's line-of-sight substantially perpendicular to the forward-facing surface of said frame; and
 a mounting member disposed in said mounting aperture and attached to said rim for fixedly mounting said frame substantially perpendicular to said hunter's line-of-sight on a barrel of a hunting gun extending through a central opening formed in said mounting member, said gun barrel having an outer surface defining an exterior profile, and said mounting member comprises a compressible element having an outer surface engageable with the inner surface and rim of said mounting aperture in said frame to hold said mounting member in said mounting aperture and said mounting member having an inner surface defining an interior profile substantially conforming to the exterior profile of said gun barrel so as to provide an interference fit between the outer surface of the gun barrel and the inner surface of the mounting member, said interference fit providing sufficient frictional force to fixedly mount the frame on the outer surface of the gun barrel.

13. The hunting decoy of claim 12, wherein said mounting member comprises a U-shaped compressible element lining the surface of said mounting aperture.

14. The hunting decoy of claim 13, wherein said mounting member comprises a rubber grommet.

15. The hunting decoy of claim 14, wherein said rubber grommet has a collar on each side thereof defining a groove for receiving the rim and inner surface of said mounting aperture.

16. The hunting decoy of claim 12, wherein said hunting gun is selected from the group consisting of a 10 gauge shotgun, a 12 gauge shotgun, a 16 gauge shotgun, a 20 gauge shotgun, a 28 gauge shotgun, a .410 bore shotgun, and a rifle.

17. The hunting decoy of claim 12, wherein said frame further has a channel connecting the sight window with the mounting aperture for receiving a vent rib of a hunting gun.

18. The hunting decoy of claim 12, wherein the decoy image comprises camouflage or a likeness of an animal.

19. The hunting decoy of claim 18, wherein the likeness of an animal is selected from the group consisting of a turkey, a deer, an antelope, an elk, a coyote, a bobcat, a boar, a moose, a caribou, a bison, a bear, a cougar, a sheep, a mountain goat, a cow, a crane, a goose, and a swan.

20. The hunting decoy of claim 12, wherein said frame is a substantially flat panel member, and said decoy image is either two dimensional or three dimensional.

* * * * *